United States Patent
Ben-Itzhak et al.

(10) Patent No.: US 11,526,785 B2
(45) Date of Patent: Dec. 13, 2022

(54) PREDICTABILITY-DRIVEN COMPRESSION OF TRAINING DATA SETS

(71) Applicant: VMware, Inc., Palo Alto, CA (US)

(72) Inventors: Yaniv Ben-Itzhak, Afek (IL); Shay Vargaftik, Nazareth-Illit (IL)

(73) Assignee: VMware, Inc., Palo Alto, CA (US)

( * ) Notice: Subject to any disclaimer, the term of this patent is extended or adjusted under 35 U.S.C. 154(b) by 367 days.

(21) Appl. No.: 16/908,498

(22) Filed: Jun. 22, 2020

(65) Prior Publication Data

US 2021/0397990 A1  Dec. 23, 2021

(51) Int. Cl.
*G06N 20/00* (2019.01)
*G06N 5/04* (2006.01)

(52) U.S. Cl.
CPC .............. *G06N 5/04* (2013.01); *G06N 20/00* (2019.01)

(58) Field of Classification Search
CPC .................................. G06N 5/04; G06N 20/00
See application file for complete search history.

(56) References Cited

U.S. PATENT DOCUMENTS

| | | | |
|---|---|---|---|
| 7,555,155 B2 | 6/2009 | Levenson et al. | |
| 8,041,733 B2 | 10/2011 | Rouhani-Kalleh | |
| 9,576,201 B2 | 2/2017 | Wu et al. | |
| 10,162,850 B1 | 12/2018 | Jain et al. | |
| 10,402,641 B1 | 9/2019 | Dang et al. | |
| 10,409,805 B1 | 9/2019 | Jain et al. | |
| 10,726,374 B1 | 7/2020 | Engineer et al. | |
| 11,181,553 B2 | 11/2021 | Absher et al. | |
| 11,250,311 B2 | 2/2022 | Johansen et al. | |
| 11,341,354 B1 | 5/2022 | Ko et al. | |
| 11,341,626 B2 | 5/2022 | Wen et al. | |
| 2020/0202256 A1 | 6/2020 | Chaudhari et al. | |
| 2020/0387755 A1* | 12/2020 | Hagen | G06K 9/6257 |
| 2021/0216831 A1 | 7/2021 | Ben-Itzhak et al. | |
| 2021/0241175 A1 | 8/2021 | Harang et al. | |
| 2021/0256420 A1* | 8/2021 | Elisha | G06N 5/04 |
| 2021/0350284 A1* | 11/2021 | Agrawal | G06K 9/6256 |

(Continued)

OTHER PUBLICATIONS

NAsadi et al., "Runtime Optimizations for Tree-Based Machine Learning Models", IEEE Transactions on Knowledge and Data Engineering, vol. 26, No. 9, Sep. 2014, pp. 2281-2292.

(Continued)

*Primary Examiner* — Thaddeus J Plecha

(57) ABSTRACT

Techniques for performing predictability-driven compression of training data sets used for machine learning (ML) are provided. In one set of embodiments, a computer system can receive a training data set comprising a plurality of data instances and can train an ML model using the plurality of data instances, the training resulting in a trained version of the ML model. The computer system can further generate prediction metadata for each data instance in the plurality of data instances using the trained version of the ML model and can compute a predictability measure for each data instance based on the prediction metadata, the predictability measure indicating a training value of the data instance. The computer system can then filter one or more data instances from the plurality of data instances based on the computed predictability measures, the filtering resulting in a compressed version of the training data set.

21 Claims, 6 Drawing Sheets

(56) References Cited

U.S. PATENT DOCUMENTS

2022/0083917 A1    3/2022   Ben-Itzhak et al.
2022/0101203 A1*   3/2022   Li ........................ G06N 20/00

OTHER PUBLICATIONS

James Browne et al., "Forest Packing: Fast, Parallel Decision Forests", Jun. 19, 2018, 9 pages.
Md. Al Mehedi Hasan et al., "Support Vector Machine and Random Forest Modeling for Intrusion Detection System (IDS)", Journal of Intelligent Learning Systems and Applications, Published Online Feb. 2014, (http://www.scirp.org/journal/jilsa), http://dx.doi.org/10.4236/jilsa.2014.61005, pp. 45-52.
Jong Hwan Ko et al., "Edge-Host Partitioning of Deep Neural Networks with Feature Space Encoding for Resource-Constrained Internet-of-Things Platforms", Feb. 11, 2018, 7 pages.
Mahbod Tavallaee et al., "A Detailed Analysis of the KDD CUP 99 Data Set", Jul. 2009, 8 pages.
Shahid Raza et al., "SVELTE: Real-time intrusion detection in the Internet of Things", May 17, 2013, 14 pages.
Kamaldeep Singh et al., "Big Data Analytics framework for Peer-to-Peer Botnet detection using Random Forests", Information Sciences 278 (2014) pp. 488-497.
Surat Teerapittayanon et al., "BranchyNet: Fast Inference via Early Exiting from Deep Neural Networks", Sep. 6, 2017, 7 pages.
Surat Teerapittayanon et al., "Distributed Deep Neural Networks over the Cloud, the Edge and End Devices", 2017 IEEE 37th International Conference on Distributed Computing Systems, pp. 328-339.
Arijit Ukil et al., "IoT Healthcare Analytics: The Importance of Anomaly Detection", 2016 IEEE 30th International Conference on Advanced Information Networking and Applications, pp. 994-997.
Brian Van et al., "Accelerating a random forest classifier: multi-core, GP-GPU, or FPGA?", Apr. 2012, 9 pages.
Jiong Zhang et al., "Network Intrusion Detection using Random Forests", School of Computing, Queen's University, Kingston, Ontario, Canada, PST, 2005—Citeseer, 9 pages.
K. Hsieh, et al., "Gaia: Geo-distributed machine learning approaching LAN speeds," in 14th USENIX Symposium on Networked Systems Design and Implementation(NSDI 17), pp. 629-647, 2017.
T. Chilimbi, et al., "Project Adam: Building an efficient and scalable deep learning training system," in 11th USENIX Symposium on Operating Systems Design and Implementation (OSDI 14), pp. 571-582, 2014.
Jakub Konecny, et al., "Federated Learning: Strategies for Improving Communication Efficiency," arXiv preprint arXiv:1610.05492, 5 pages, 2016.
H. Daga, et al., "Cartel: A System for Collaborative Transfer Learning at the edge," in Proceedings of the ACM Symposium on Cloud Computing, 21 pages, 2019.
A. Padmanabha Iyer, et al., "Mitigating the Latency-accuracy Trade-off in Mobile Data Analytics Systems," in Proceedings of the 24th Annual International Conference on Mobile Computing and Networking, pp. 513-528, 2018.
Related U.S. Appl. No. 16/518,808, filed Jul. 22, 2019 (unpublished).
Related U.S. Appl. No. 17/021,454, filed Sep. 15, 2020 (unpublished).
Related to pending U.S. Appl. No. 16/743,865; Office Action dated Jul. 8, 2022.

\* cited by examiner

PREDICTABILITY-DRIVEN COMPRESSION OF TRAINING DATA SETS

BACKGROUND

In machine learning (ML), mathematical models known as ML models are trained using training data sets in order to make predictions or decisions about unknown data. For example, in the case of supervised classification (which is one type of ML technique that involves classifying unlabeled data instances), an ML model referred to as an ML classifier is provided a training data set comprising labeled data instances—in other words, data instances that include one or more attributes (i.e., features) and a label indicating the correct class to which the data instance belongs—and is trained towards predicting the labeled class for each data instance. Upon being trained in this manner, the ML classifier can be deployed to classify new, unlabeled data instances.

As machine learning has grown in popularity and usage, the sizes of the training data sets used to train ML models have also grown significantly. This has led to a number of challenges, such as how to process such large data sets on computing devices/systems with limited memory and/or storage capacity, how to efficiently communicate such large data sets between machines in distributed training environments, how to enable real-time ML model availability, and so on.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure are directed to techniques for compressing (i.e., reducing the size of) a training data set X used for training an ML model M, such that the performance of ML model M as trained via the compressed training data set (i.e., X') is comparable to the performance achievable by M if trained using original, uncompressed training data set X.

Generally speaking, these techniques involve computing a "predictability" measure for each data instance in training data set X, where the predictability measure indicates how easy or difficult it is to generate a correct prediction for the data instance, and therefore how valuable that data instance is to the training process (i.e., to what degree using that data instance for training will change/affect the resulting trained model). For the classification use case, this predictability measure can also be understood as indicating whether the data instance is a typical representative of its labeled class. A data instance with high predictability is one for which generating a correct prediction is easy, and thus such a data instance has relatively low training value because training an ML model using that data instance will most likely have a small/insignificant impact on the performance of the trained model. Conversely, a data instance with low predictability is one for which generating a correct prediction is difficult, and thus such a data instance has relatively high training value because training an ML model using that data instance will likely have a significant impact on the performance of the trained model.

Once a predictability measure for each data instance is computed, training data set X is filtered (i.e., one or more data instances are removed) based on these predictability measures, such that a greater percentage of removed data instances are high predictability (i.e., low training value) data instances rather than low predictability (i.e., high training value) data instances. The end result of this process is a compressed training data set X' that has fewer data instances than original training data set X, and yet enables ML model M to reach a level of prediction accuracy/performance that is competitive with X In some scenarios, using compressed training data set X' to train ML model M may even result in superior prediction accuracy/performance than using original training data set X because the compression may reduce noise in the training data.

2. Solution Architecture and High-Level Compression Workflow

Figure 1:
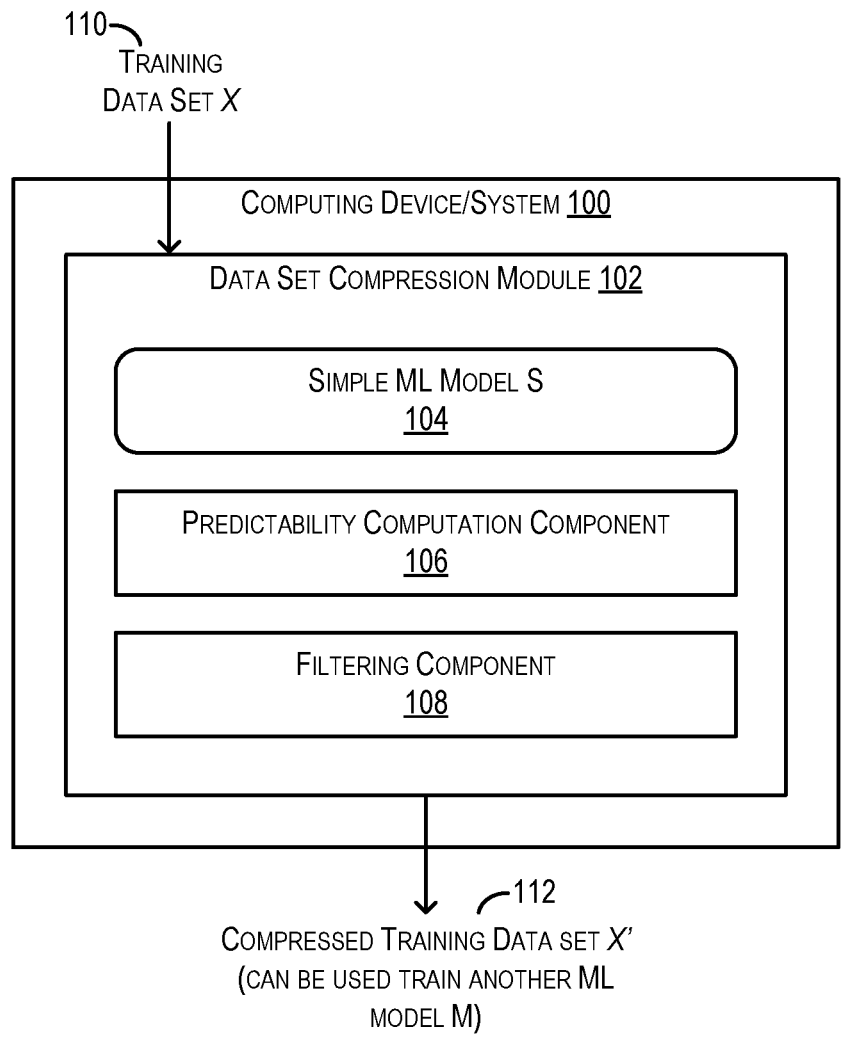
FIG. 1 depicts a computing device/system that implements the techniques of the present disclosure.

FIG. 1 depicts a computing device/system 100 that implements the predictability-driven compression techniques of the present disclosure. As shown, computing device/system 100 comprises a data set compression module 102 that includes a simple ML model S (reference numeral 104), a predictability computation component 106, and a filtering component 108. Data set compression module 102, which may be implemented in software, hardware, or a combination thereof, is configured to receive as input a training data set X (reference numeral 110) and to generate as output a compressed version of X (i.e., compressed training data set X'; reference numeral 112). Compressed training data set X' can be subsequently used to train another ML model M (which, in certain embodiments, may be more complex than simple ML model S of data set compression module 102). For example, in a particular embodiment simple ML model S may be a simple (e.g., small) random forest classifier and ML model M may be a more complex (e.g., larger) random forest classifier.

Figure 2:
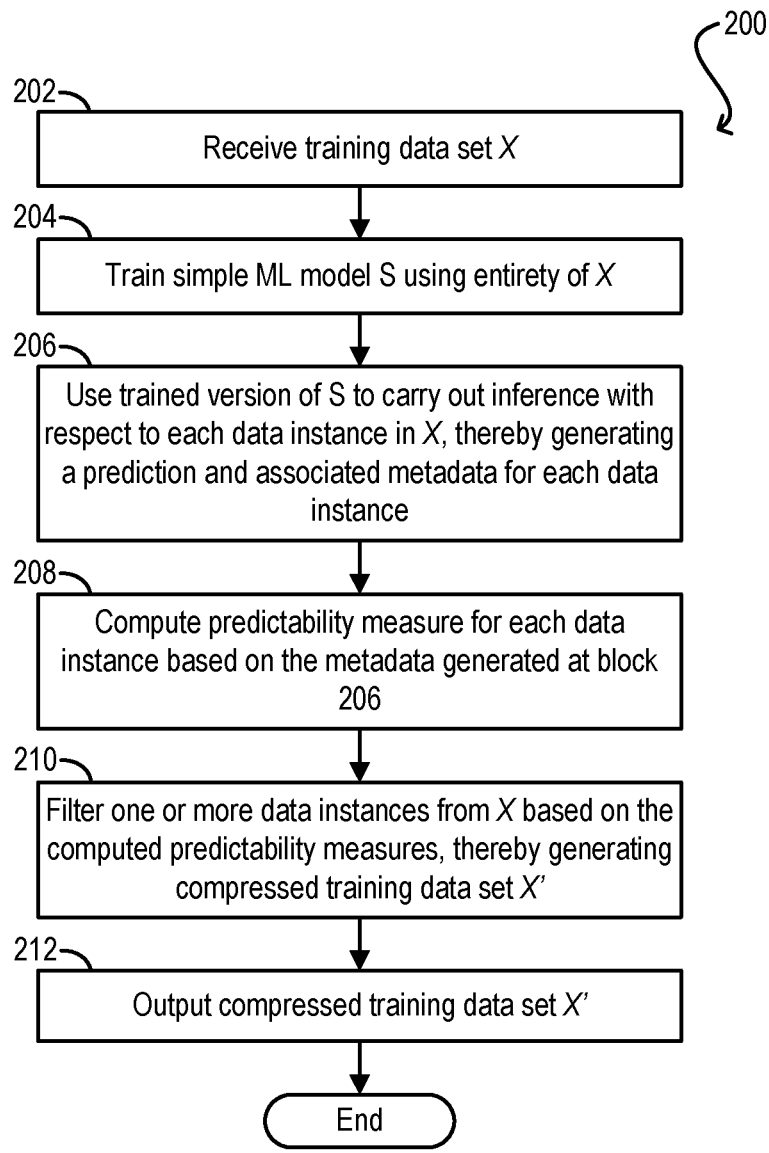
FIG. 2 depicts a high-level compression workflow according to certain embodiments.

FIG. 2 depicts a high-level workflow 200 that may be executed by data set compression module 102 of FIG. 1 and its constituent components 104-108 for compressing training data set X and generating compressed training data set X' according to certain embodiments. As used herein, a "workflow" refers to a series of actions or steps that may be taken by one or more entities (in this case, modules 102-108). Starting with blocks 202 and 204, data set compression module 102 can receive training data set X and can train simple ML model S using the entirety of X, resulting in a trained version of S. For example, assuming training data set X comprises n data instances, data set compression module 102 can train simple ML model S using all n data instances at block 204. In embodiments where training data set X is a labeled data set (and thus used for supervised ML), each data instance i in X for i=1 . . . n can include a feature set $x_i$ comprising m features $(x_{i1}, x_{i2}, \ldots, x_{im})$ and a label $y_i$ indicating the correct prediction for feature set $x_i$.

At block 206, data set compression module 102 can use the trained version of S to carry out inference with respect to each data instance i in training data set X, which is the act of generating a prediction for each data instance i and associated prediction metadata. In the scenario where S is a supervised ML classifier such as a random forest classifier, this prediction metadata can include a class distribution vector that comprises, for each possible class to which the data instance may be classified, a probability value indicating the predicted likelihood that the data instance belongs to that class.

Then, at block 208, data set compression module 102 can compute, via predictability computation component 106, a predictability measure $p_i$ for each data instance i based at least in part on the prediction metadata generated by the trained version of S at block 206. In various embodiments, this predictability measure can indicate how easy or difficult it was for the trained version of S to generate a correct prediction for the data instance, and thus how valuable the data instance is likely to be for training other ML models such as ML model M. For example, a high predictability measure can indicate that the data instance was easy for the trained version of S to predict and thus has a low training value, while a low predictability measure can indicate that the data instance was difficult for the trained version of S to predict and thus has a high training value.

It should be noted that this predictability measure is inherently different from the confidence level (i.e., probability value) that the trained version of S may output with respect to its prediction for a given data instance; for example, if S generates a prediction with a high confidence level but the prediction is wrong, then the data instance has a low predictability measure. On the other hand, if S generates a prediction with a high confidence level and the prediction is correct, then the data instance has a high predictability measure.

In the example mentioned above where simple ML model S is a supervised ML classifier and the prediction metadata generated at block 206 includes class distribution vectors, component 106 can compute predictability measure $p_i$ for each data instance i based on a calculated distance between the class distribution vector generated by S for i and a "perfect" class distribution vector derived from class label $y_i$ for i in training data set X This particular approach is detailed in section (3) below. In other embodiments component 106 can compute predictability measure $p_i$ in other ways, and potentially in combination with other types of metadata or information (such as information gleaned from training data set X itself).

Upon computing the per-instance predictability measures at block 208, data set compression module 102 can use filtering component 108 to filter (i.e. remove) some number of data instances from X based on their respective predictability measures, thereby generating compressed training data set X' (block 210). Generally speaking, this filtering can be performed in a manner that causes higher predictability (i.e., lower training value) data instances to be filtered with greater frequency/likelihood than lower predictability (i.e., higher training value) data instances, which in certain embodiments can allow compressed training data set X' to have fewer data instances than original training data set X without affecting the ability of X' to construct a comparably strong (i.e., well-performing) ML model. As noted previously, in some scenarios compressed training data set X' may actually result in an ML model that exhibits superior prediction accuracy/performance than original training data set X due to possible noise reduction in the training data. A particular histogram-based approach for implementing the filtering at block 210 is detailed in section (4) below.

Finally, at block 212, data set compression module 102 can output compressed training data set X' and workflow 200 can end.

It should be appreciated that FIGS. 1 and 2 are illustrative and not intended to limit embodiments of the present disclosure. For example, although data set compression module 102 is shown in FIG. 1 as running on a single computing device/system 100, in some embodiments the various components of module 102 (i.e., simple ML model S, predictability computation component 106, and filtering component 108) may be distributed across multiple computing devices/systems for enhanced performance, reliability, fault tolerance, or other reasons.

Further, in an environment where several servers are configured to work in tandem to perform ML training, each server can independently fully or partially implement data set compression module 102 in order to reduce the size of its local training data set, which in turn can advantageously reduce the amount of network traffic needed between the servers to complete the training process.

Yet further, although FIG. 1 depicts a particular arrangement of components within data set compression module 102, other arrangements are possible (e.g., the functionality attributed to a particular component may be split into multiple components, components may be combined, etc.) and each component may include sub-components or implement functions that are not specifically described. For example, in a particular embodiment simple ML model S may be composed of an ensemble of multiple ML models and the predictability measures may be calculated as a function of the multiple models' outputs (e.g., average, median, etc.). One of ordinary skill in the art will recognize other variations, modifications, and alternatives.

3. Computing Predictability

Figure 3:
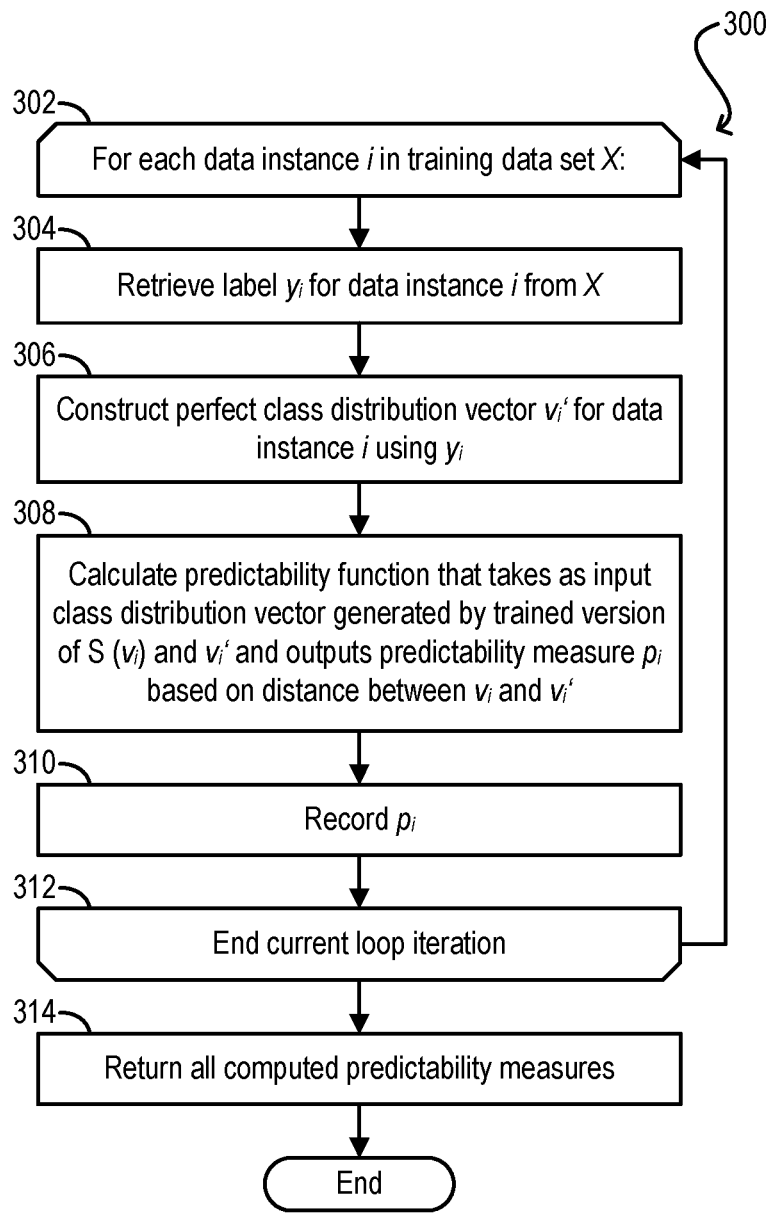
FIG. 3 depicts a workflow for computing predictability measures according to certain embodiments.

FIG. 3 depicts a workflow 300 that may be executed by predictability computation component 106 of data set compression module 102 for computing the predictability measures of the data instances in training data set X (per block 208 of FIG. 2) according to certain embodiments. Workflow 300 assumes that (1) simple ML model S of data set compression module 102 is a supervised ML classifier, (2) each data instance i has a corresponding label $y_i$ in X identifying the correct class for that data instance, and (3) the trained version of S has generated a class distribution vector $v_i$ for each data instance i in accordance with block 206 of workflow 200.

Starting with block 302, predictability computation component 106 can enter a loop for each data instance i in training data set X for i=1 . . . n. Within the loop, predictability computation component 106 can retrieve label $y_i$ for data instance i from X (block 304) and construct a "perfect" class distribution vector $v_i'$ for data instance i based on label $y_i$—in other words, a class distribution vector that includes a probability value of 1 for the class identified by $y_i$ (i.e., the correct class for i) and a probability value of 0 for all other classes in the vector, and thus perfectly predicts correct class $y_i$ (block 306). For example, if there are three possible classes C1, C2, and C3 and $y_i$=C1, then $v_i'$ would take the form <1, 0, 0> (assuming the elements of the vector correspond to C1, C2, and C3 in that order).

At block 308, predictability computation component 106 can calculate a predictability function that takes as input perfect class distribution vector $v_i'$ and class distribution vector $v_i$ generated by the trained version of S and that outputs a predictability measure $p_i$ for data instance i based on a distance between $v_i'$ and $v_i$. In various embodiments, this predictability function can be configured such that the value of $p_i$ increases as the distance between $v_i'$ and $v_i$ decreases (and vice versa), as this captures the idea that high predictability indicates the data instance was easy to predict/classify (and thus predicted vector $v_i$ is "close" to perfect vector $v_i'$) while low predictability indicates the data instance was difficult to predict/classify (and thus predicted vector $v_i$ is "far" from perfect vector $v_i'$).

The particular distance metric that is employed by the predictability function at block 308 can vary depending on the implementation. The following is one example formulation of the predictability function that utilizes the L2 norm to compute the distance between $v_i'$ and $v_i'$.

$$1 - \frac{1}{\sqrt{2}} \times \|v_i - v_i'\|_2 \qquad \text{Listing 1}$$

In the example formulation above, the function constants are chosen such that the resulting predictability measure falls within the range [0, 1].

Upon computing $p_i$ at block 308, predictability computation component 106 can record this value (block 310), reach the end of the current loop iteration (block 312), and return to the top of the loop in order to process the next data instance in training data set X Finally, at block 314, all of the computed predictability measures can be returned and the workflow can end.

4. Histogram-Based Filtering

Figure 4:
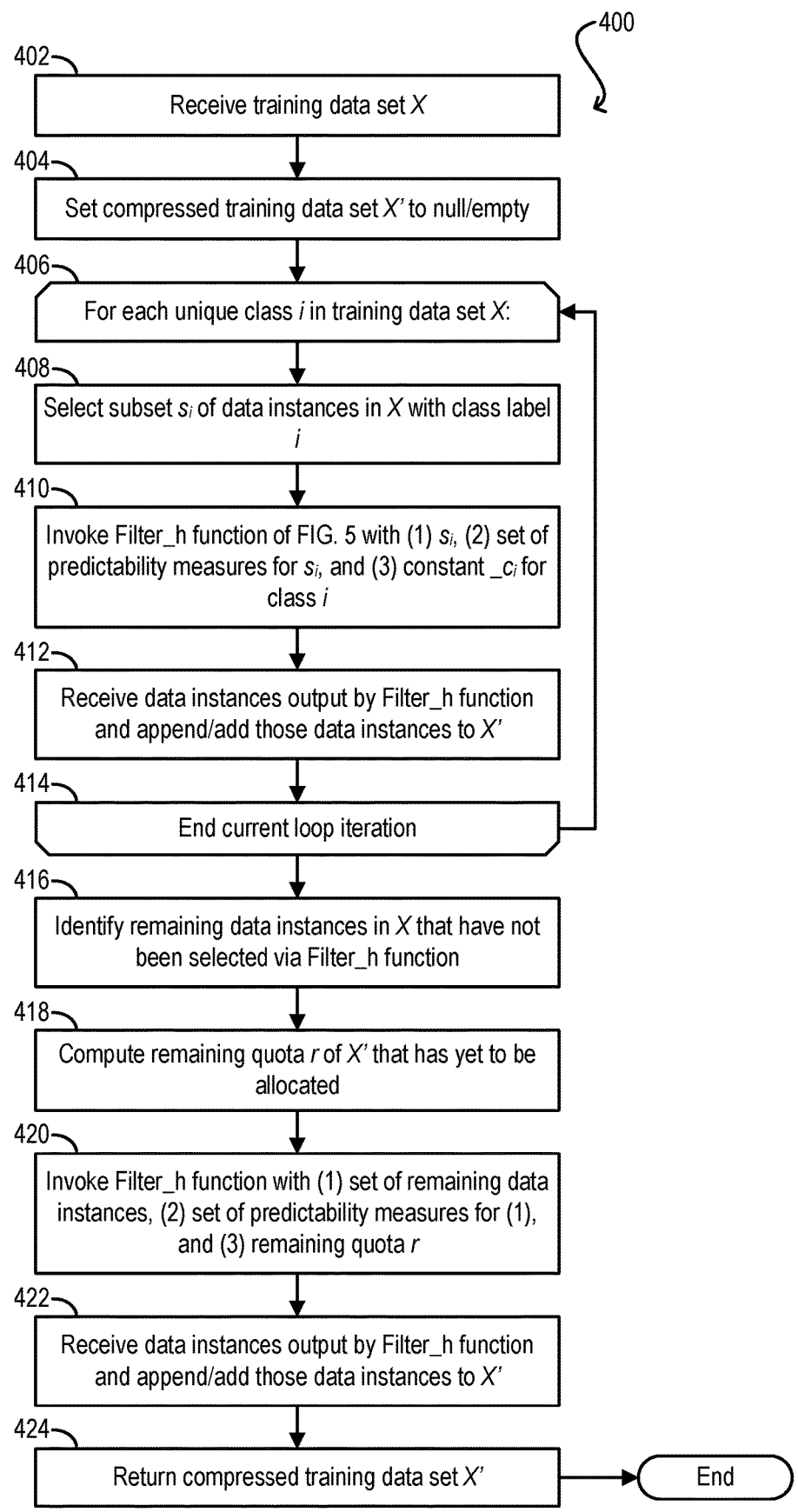
FIGS. 4 and 5 depict workflows for performing histogram-based filtering according to certain embodiments.
Figure 5:
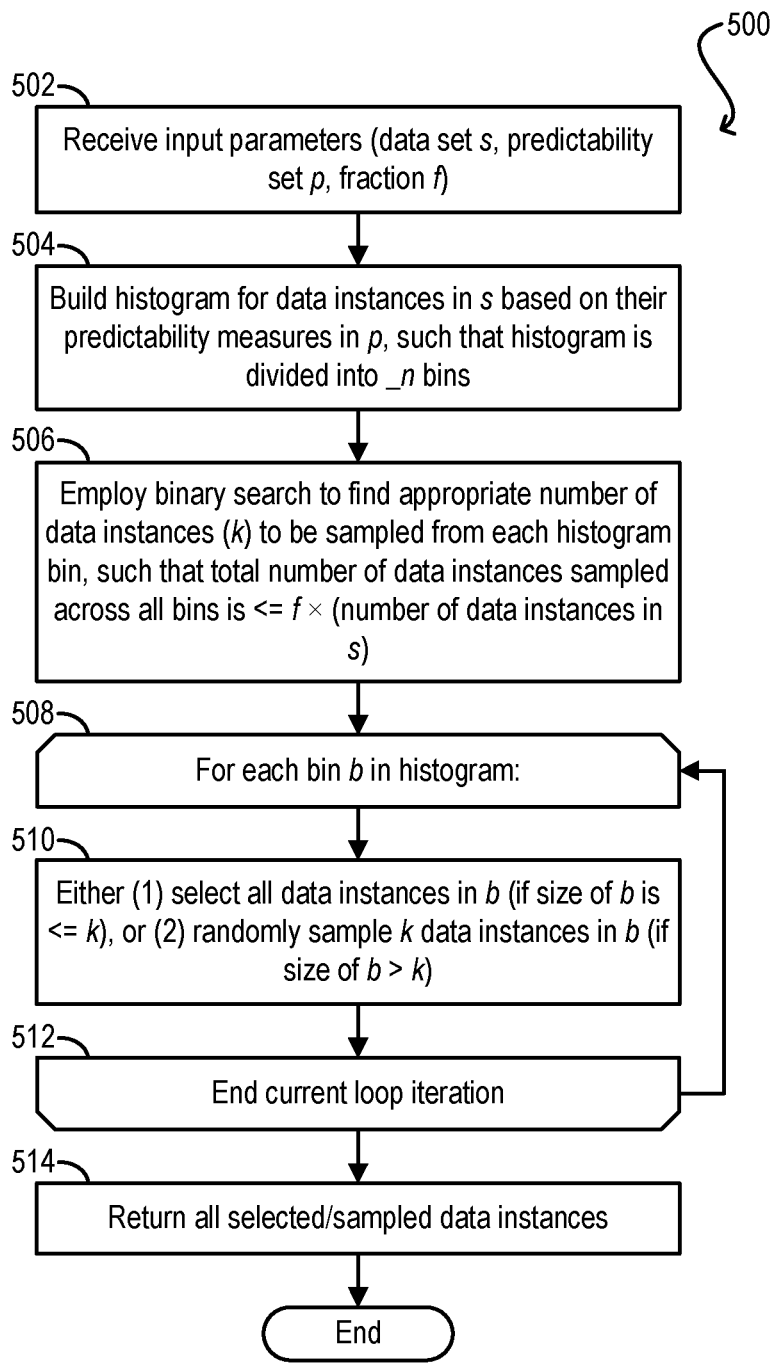

FIGS. 4 and 5 depict workflows that may be executed by filtering component 108 of data set compression module 102 for filtering data instances from training data set X based on their respective predictability measures (and thereby generating compressed training data set X') using a histogram-based approach in accordance with certain embodiments.

In particular, workflow 400 of FIG. 4 presents the high-level filtering algorithm (referred to as "Filter Dataset") which involves dividing a desired quota of data instances to be included in compressed training data set X' into two portions: a first portion that reserves a certain number of data instances in X' for each labeled class identified in training data set X, and a second portion that is filled with data instances selected globally from X (regardless of their labeled classes). And workflow 500 of FIG. 5 presents a function invoked by workflow 400 for each of the first and second portions (referred to as "Filter_h") that generates a histogram of data instances based on their predictability measures and samples instances from each bin in the histogram.

Figure 6:
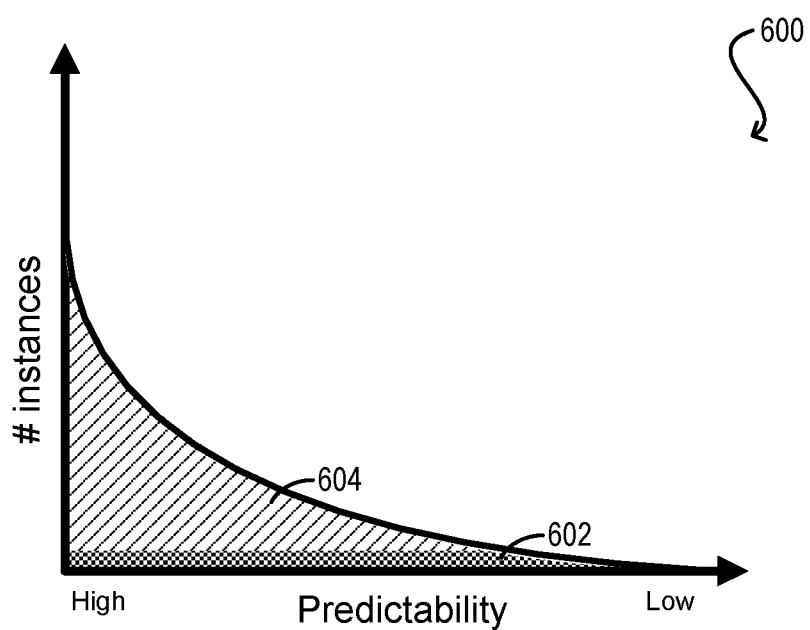
FIG. 6 is a graph illustrating how the data instances in a training data set may be rebalanced via the histogram-based filtering of FIGS. 4 and 5 according to certain embodiments.

With the combination of workflows 400 and 500, training data set X can be effectively "rebalanced" through the filtering process, such that compressed data set X' includes an approximately equal number of higher and lower predictability data instances (rather than mostly high predictability data instances, which will typically be the case for original training data set X). The effect of this rebalancing is illustrated in graph 600 of FIG. 6, where area 602 represents the data instances chosen for inclusion in compressed training data set X' and area 604 represents the data instances that are filtered/removed.

Starting with block 402 of workflow 400, filtering component 108 can receive as input training data set X, the predictability measures computed for the data instances in X (per, e.g., workflow 300 of FIG. 3), a user-defined constant c indicating the desired compression ratio/factor for compressed training data set X'. and a user-defined constant $\_c_i$ for each unique labeled class i in X indicating the desired proportion of c to be reserved for data instances labeled with class i. In one set of embodiments, $\_c_i$ can be set to $$\frac{1}{2} \times \frac{\_c}{\text{\# of classes}},$$

which divides half of the instance quota for X' evenly among the classes in X.

At blocks 404 and 406, filtering component 108 can initialize compressed training data set X' to null/empty and enter a loop for each class i, where i=1 . . . k and k corresponds to the total number of unique labeled classes in X Within this loop, filtering component 108 can select a subset $s_i$ of data instances from X that have class label i (block 408). Filtering component 108 can then invoke the Filter_h function of workflow 500 with the following input parameters: (1) data instance subset $s_i$, (2) the set of computed predictability measures for the data instances in and (3) and constant $\_c_i$ for class i (block 410).

Turning now to workflow 500, at block 502 the three input parameters provided at block 410 of workflow 400 (locally referred to in workflow 500 as data set s, predictability set p, and fraction f) are received. In response, filtering component 108 can build a histogram for the data instances in s based on their predictability measures p, such that the histogram is divided into n bins (where n is a user-defined constant) (block 504), and employ a binary search to find an appropriate number of data instances (k) to be sampled from each histogram bin such that the total number of data instances sampled across all bins is less than or equal to fraction f x (number of data instances in s) (block 506).

Upon building the histogram and determining variable k, filtering component 108 can enter a loop for each histogram bin b (where b=1 . . . \_n) (block 508) and either (1) select all of the data instances in bin b (if the size of b is less than or equal to k) or (2) randomly sample k data instances in b (if the size of b is greater than k) (block 510). Alternatively, filtering component 108 may use any other technique to sample the k data instances from bin b, such as via stratified sampling or another reasonable selection rule. At the end of this loop (block 512), filtering component 108 can return all of the selected/sampled data instances (block 514).

Returning to block 412 of workflow 400, filtering component 108 can receive the data instances output by the Filter_h function of workflow 500, append/add those data instances to compressed training data set X', and return to the top of the loop to process the next class in X Upon processing all of the classes (block 414), filtering component 108 can identify the set of remaining data instances in training data set X that have not been selected via the Filter_h function (block 416) and compute the remaining quota r of X' that has yet to be allocated as $$\_c = \frac{\text{length(selected data instances)}}{\text{length}(X)} \text{(block 418)}.$$

At block 420, filtering component 108 can once again invoke the Filter_h function of workflow 500, this time with the following input parameters: (1) the set of remaining unselected data instances, (2) the set of computed predictability measures for data instances in (1), and (3) the remaining quota r. In response, the Filter_h function can select/sample a portion of the remaining data instances in accordance with the steps of workflow 500 and return the selected/sampled data instances.

At block 422, filtering component 108 can receive the data instances output by the Filter_h function and append/add those data instances to compressed training data set X'. Finally, filtering component 108 can return compressed training data set X' (block 424) and terminate the workflow.

To clarify the operation of workflows 400 and 500, listings 2 and 3 below present example pseudo-code for implementing these workflows respectively. In listing 2, training data set X is identified as (X,y) where X is a matrix of feature set vectors for the data instances in the training data set and y is a vector of class labels for those data instances. Similarly, compressed training data set X' is identified as (X',y') where X' is a matrix of feature set vectors for the data instances in the compressed training data set and y' is a vector of class labels for those data instances.

Listing 2

FUNCTION: Filter_Dataset
INPUT: (X,y), predictability
PARAMETERS: $\_c_i | i \in \text{unique}(y), \_c$
1:   classes = Unique(y)
2:   (X',y') = [ ]
3:   For i in classes:
4:     $(X_i, y_i)$, $p_i$ = (X,y)[y==i], predictability[y==i]
5:     (X',y').append(Filter_h(($X_i,y_i$), $p_i, \_c_i$))
6:     (X'',y''), p = (X,y)[y!=y'], predictability[y!=y']
7:     r = $\_c$ − len((X',y'))/len(X,y))
8:     (X',y').append(Filter_h((X'',y''), p, r))
9:     return (X',y')

Listing 3

FUNCTION: Filter_h
INPUT: (X,y), predictability, fraction
PARAMETERS: $\_n$
1:   Bins, Len = Hist((X,y), predictability, $\_n$)
2:   Binary search for maximum k such that:
3:     sum([min(i,k), i ∈ Len]) <= fraction·len((X,y))
4:   (X',y') = [ ]
5:   for B, L in Bins, Len:
6:     if L <= k:
7:       (X',y').append(B)
8:     else:
9:       (X',y').append(rand(B,k))
10   return (X',y')

5. Extensions

As mentioned previously, once data set compression module 102 has generated compressed training data set X', X' can be used to train another ML model M (which is different from, and may be more complex than, simple ML model S of module 102). The trained version of ML model M can thereafter be used to perform prediction with respect to new, unknown (i.e., query) data instances.

In certain embodiments, rather than using the trained version of M by itself to carry out prediction, M can be used in combination with the trained version of simple ML model S. In particular, a given query data instance can first be passed as input to S and S can generate a prediction and associated confidence level for the query. If the generated confidence level is above a predetermined threshold (indicating that S has high confidence in the prediction), that prediction can be returned as the final prediction result for the query data instance.

On the other hand, if the confidence level generated by S is below the threshold, the query data instance can be passed to M for prediction. The prediction generated by M can then be returned as the final prediction result for the query data instance. This approach, which is described in further detail in commonly owned U.S. patent application Ser. No. 16/743,865, can advantageously reduce the average amount of time needed to perform prediction in scenarios where most query data instances are "easy" queries (i.e., can be predicted by simple ML model S with high confidence).

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
   receiving, by a computer system, a training data set comprising a plurality of data instances;
   training, by the computer system, a first machine learning (ML) model using the plurality of data instances, the training resulting in a trained version of the first ML model;
   for each data instance in the plurality of data instances:
   generating, by the computer system, prediction metadata for the data instance via the trained version of the first ML model; and
   computing, by the computer system, a predictability measure for the data instance based on the prediction metadata, the predictability measure indicating a training value of the data instance; and
   filtering, by the computer system, one or more data instances from the plurality of data instances based on the computed predictability measures, the filtering resulting in a compressed version of the training data set.

2. The method of claim 1 further comprising:
   training a second ML model using the compressed version of the training data set, the second ML model being a more complex ML model than the first ML model.

3. The method of claim 1 wherein the first ML model is an ML classifier and wherein the prediction metadata generated for each data instance includes a class distribution vector.

4. The method of claim 3 wherein computing the predictability measure comprises:
   retrieving, from the training data set, a class label for the data instance;
   constructing a perfect class distribution vector based on the class label; and
   computing a distance between the class distribution vector and the perfect class distribution vector.

5. The method of claim 1 wherein a high value for the predictability measure indicates that the data instance has low training value and wherein a low value for the predictability measure indicates that the data instance has high training value.

6. The method of claim 1 wherein the filtering comprises:
   removing, from the training data set, data instances with high predictability measures at a higher frequency or likelihood than data instances with low predictability measures.

7. The method of claim 2 further comprising:
   receiving a query data instance;
   generating, via the trained version of the first ML model, a first prediction for the query data instance and a confidence level for the first prediction;
   if the confidence level for the first prediction exceeds a threshold, returning the first prediction as a final prediction result for the query data instance; and
   if the confidence level for the first prediction does not exceed the threshold:
   generating, via the trained version of the second ML model, a second prediction for the query data instance; and
   returning the second prediction as the final prediction result for the query data instance.

8. A non-transitory computer readable storage medium having stored thereon program code executable by a computer system, the program code causing the computer system to execute a method comprising:
   receiving a training data set comprising a plurality of data instances;
   training a first machine learning (ML) model using the plurality of data instances, the training resulting in a trained version of the first ML model;
   for each data instance in the plurality of data instances:
   generating prediction metadata for the data instance via the trained version of the first ML model; and
   computing a predictability measure for the data instance based on the prediction metadata, the predictability measure indicating a training value of the data instance; and
   filtering one or more data instances from the plurality of data instance based on the computed predictability measures, the filtering resulting in a compressed version of the training data set.

9. The non-transitory computer readable storage medium of claim 8 wherein the method further comprises:
   training a second ML model using the compressed version of the training data set, the second ML model being a more complex ML model than the first ML model.

10. The non-transitory computer readable storage medium of claim 8 wherein the first ML model is an ML classifier and wherein the prediction metadata generated for each data instance includes a class distribution vector.

11. The non-transitory computer readable storage medium of claim 10 wherein computing the predictability measure comprises:
    retrieving, from the training data set, a class label for the data instance;
    constructing a perfect class distribution vector based on the class label; and
    computing a distance between the class distribution vector and the perfect class distribution vector.

12. The non-transitory computer readable storage medium of claim 8 wherein a high value for the predictability measure indicates that the data instance has low training value and wherein a low value for the predictability measure indicates that the data instance has high training value.

13. The non-transitory computer readable storage medium of claim 8 wherein the filtering comprises:
removing, from the training data set, data instances with high predictability measures at a higher frequency or likelihood than data instances with low predictability measures.

14. The non-transitory computer readable storage medium of claim 9 wherein the method further comprises:
receiving a query data instance;
generating, via the trained version of the first ML model, a first prediction for the query data instance and a confidence level for the first prediction;
if the confidence level for the first prediction exceeds a threshold, returning the first prediction as a final prediction result for the query data instance; and
if the confidence level for the first prediction does not exceed the threshold:
generating, via the trained version of the second ML model, a second prediction for the query data instance; and
returning the second prediction as the final prediction result for the query data instance.

15. A computer system comprising:
a processor; and
a non-transitory computer readable medium having stored thereon program code that, when executed, causes the processor to:
receive a training data set comprising a plurality of data instances;
train a first machine learning (ML) model using the plurality of data instances, the training resulting in a trained version of the first ML model;
for each data instance in the plurality of data instances:
generate prediction metadata for the data instance via the trained version of the first ML model; and
compute a predictability measure for the data instance based on the prediction metadata, the predictability measure indicating a training value of the data instance; and
filter one or more data instances from the plurality of data instances based on the computed predictability measures, the filtering resulting in a compressed version of the training data set.

16. The computer system of claim 15 wherein the program code further causes the processor to:
train a second ML model using the compressed version of the training data set, the second ML model being a more complex ML model than the first ML model.

17. The computer system of claim 15 wherein the first ML model is an ML classifier and wherein the prediction metadata generated for each data instance includes a class distribution vector.

18. The computer system of claim 17 wherein the program code that causes the processor to compute the predictability measure comprises program code that causes the processor to:
retrieve, from the training data set, a class label for the data instance;
construct a perfect class distribution vector based on the class label; and
compute a distance between the class distribution vector and the perfect class distribution vector.

19. The computer system of claim 15 wherein a high value for the predictability measure indicates that the data instance has low training value and wherein a low value for the predictability measure indicates that the data instance has high training value.

20. The computer system of claim 15 wherein the program code that causes the processor to filter the one or more data instances comprises program code that causes the processor to:
remove, from the training data set, data instances with high predictability measures at a higher frequency or likelihood than data instances with low predictability measures.

21. The computer system of claim 16 wherein the program code further causes the processor to:
receive a query data instance;
generate, via the trained version of the first ML model, a first prediction for the query data instance and a confidence level for the first prediction;
if the confidence level for the first prediction exceeds a threshold, return the first prediction as a final prediction result for the query data instance; and
if the confidence level for the first prediction does not exceed the threshold:
generate, via the trained version of the second ML model, a second prediction for the query data instance; and
return the second prediction as the final prediction result for the query data instance.

\* \* \* \* \*